(12) United States Patent
Guan

(10) Patent No.: US 9,887,988 B2
(45) Date of Patent: Feb. 6, 2018

(54) LOGIN INFORMATION TRANSMISSION METHOD, CODE SCANNING METHOD AND APPARATUS, AND SERVER

(71) Applicant: TENCENT TECHNOLOGY (SHENZHEN) COMPANY LIMITED, Shenzhen, Guangdong (CN)

(72) Inventor: Liqun Guan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/112,048

(22) PCT Filed: May 26, 2015

(86) PCT No.: PCT/CN2015/079752
§ 371 (c)(1),
(2) Date: Jul. 15, 2016

(87) PCT Pub. No.: WO2015/180611
PCT Pub. Date: Dec. 3, 2015

(65) Prior Publication Data
US 2017/0223004 A1    Aug. 3, 2017

(30) Foreign Application Priority Data
May 26, 2014    (CN) .......................... 2014 1 0225078

(51) Int. Cl.
*H04L 29/06*    (2006.01)
*H04W 12/06*    (2009.01)
(Continued)

(52) U.S. Cl.
CPC .......... *H04L 63/083* (2013.01); *G06K 7/1417* (2013.01); *G06K 17/0025* (2013.01);
(Continued)

(58) Field of Classification Search
CPC . H04L 63/083; H04L 63/0853; H04L 67/145; H04L 67/42; G06K 7/1417; G06K 17/0025; G06K 19/06037; H04W 12/06
(Continued)

(56) References Cited

U.S. PATENT DOCUMENTS 9,338,164 B1 * 5/2016 Liu ...................... H04L 63/0869
2013/0008958 A1 * 1/2013 Smith ................ G07C 9/00904
235/382

(Continued)

FOREIGN PATENT DOCUMENTS

CN    101388066 A    3/2009
CN    102509231 A    6/2012
(Continued)

OTHER PUBLICATIONS

Office Action Issued in Chinese Patent Application No. 201410225078.3, dated Aug. 17, 2015, 7 pages.
(Continued)

*Primary Examiner* — Michael S McNally
(74) *Attorney, Agent, or Firm* — Knobbe Martens Olson & Bear LLP

(57) ABSTRACT

Described are a login information transmission method, a code scanning method and apparatus, and a server. The login information transmission method includes: receiving user account number information and two-dimension code information sent from a client after the client logs in to an application and scans a two-dimension code; verifying the received user account number information and two-dimension code information; sending a confirmation request to the client, so as to request the client to confirm an application to be logged in to if verification passes; and sending login confirmation information to a corresponding application server, so as to instruct the application server to notify the
(Continued)

client to log in to the application when confirmation pass information sent from the client is received.

11 Claims, 10 Drawing Sheets

(51) Int. Cl.
*G06K 17/00* (2006.01)
*G06K 19/06* (2006.01)
*G06K 7/14* (2006.01)
*H04L 29/08* (2006.01)

(52) U.S. Cl.
CPC .... *G06K 19/06037* (2013.01); *H04L 63/0853* (2013.01); *H04L 67/145* (2013.01); *H04L 67/42* (2013.01); *H04W 12/06* (2013.01)

(58) Field of Classification Search
USPC ............................................................ 726/7
See application file for complete search history.

(56) References Cited

U.S. PATENT DOCUMENTS

| | | | |
|---|---|---|---|
| 2013/0179692 | A1 | 7/2013 | Tolba et al. |
| 2013/0263211 | A1 | 10/2013 | Neuman et al. |
| 2014/0040628 | A1 | 2/2014 | Fort et al. |
| 2014/0047431 | A1* | 2/2014 | Vaughan .................. G06F 8/65 717/171 |
| 2015/0304301 | A1* | 10/2015 | Ren ......................... H04L 63/08 726/7 |
| 2016/0036589 | A1* | 2/2016 | Toyoizumi .............. G06F 21/33 713/168 |
| 2016/0277215 | A1* | 9/2016 | Zhou .................... H04L 12/6418 |

FOREIGN PATENT DOCUMENTS

| | | |
|---|---|---|
| CN | 102685093 A | 9/2012 |
| CN | 103001973 A | 3/2013 |
| CN | 103067378 A | 4/2013 |
| CN | 103685311 A | 3/2014 |
| CN | 103701808 A | 4/2014 |
| CN | 103731543 A | 4/2014 |
| CN | 104378344 A | 2/2015 |
| WO | WO 2006/070067 A1 | 7/2006 |

OTHER PUBLICATIONS

International Search Report for International Application No. PCT/CN2015/079752, dated Aug. 21, 2015, 3 pages.
Written Opinion of the International Searching Authority for International Application No. PCT/CN2015/079752, dated Aug. 25, 2015, 5 pages.
Extended European Search Report for International Application No. PCT/CN2015/079752 dated May 17, 2017, 9 pages.

* cited by examiner

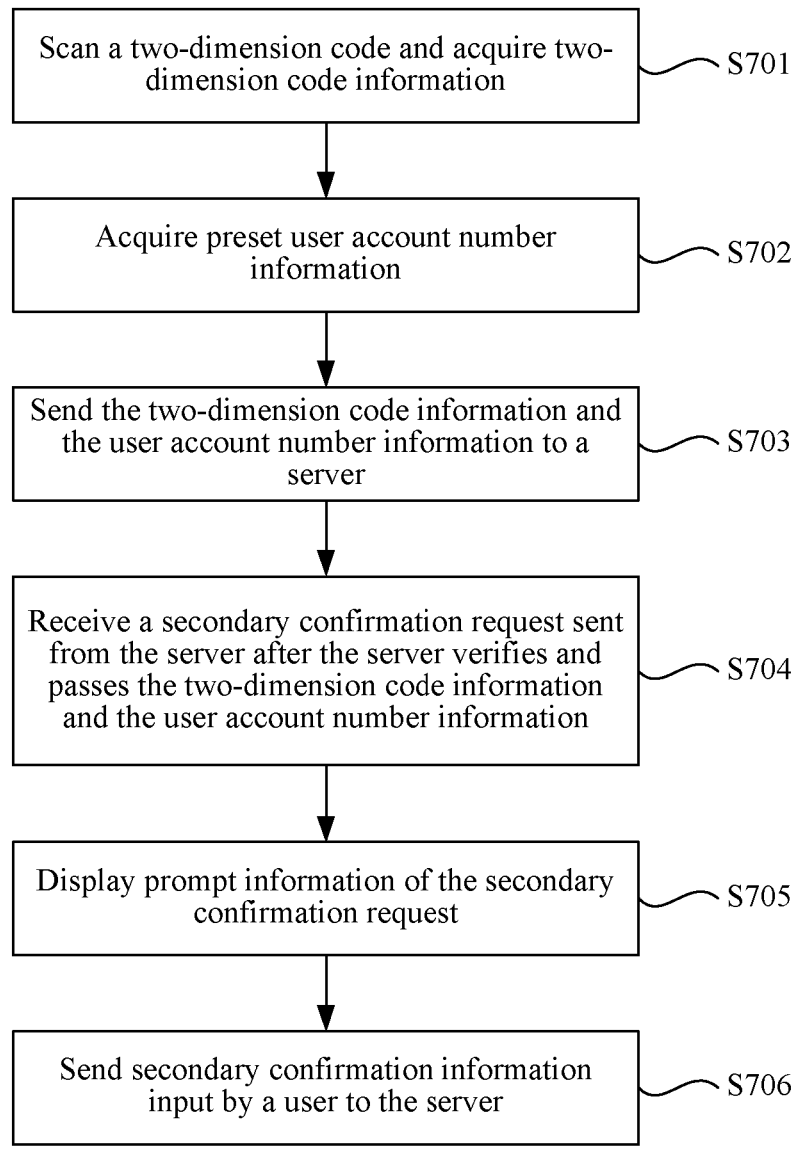

LOGIN INFORMATION TRANSMISSION METHOD, CODE SCANNING METHOD AND APPARATUS, AND SERVER

FIELD OF THE TECHNOLOGY

The present disclosure relates to the field of communications technologies, and in particular, to a login information transmission method, a code scanning method and apparatus, and a server.

BACKGROUND OF THE DISCLOSURE

A two-dimension code, also known as a two-dimension bar code, is another dimension readable bar code obtained by performing extension based on a one-dimension bar code. The two-dimension code is a black alternating with white figure distributed on a plane (two-dimension direction) by using specific geometric figures according to certain laws, and is a key of all information data. Currently, because the two-dimension code has features of large information storage capacity, high confidentiality, and low costs, the two-dimension code is gradually applied and popularized in fields such as industry and commerce, communications and transportation, finance, and medical treatment. However, in recent years, a mobile terminal two-dimension code service flourished in the field of mobile communications makes mobile terminal users enter an era in which information is readily available, and great business opportunities brought thereby become more apparent at home and abroad.

Currently, many remote servers provide a function of two-dimension code login. When a user uses an application program having permission requirements provided by a remote server, the user may photograph a two-dimension code image provided by the application program by using an own camera of a mobile terminal first, parse out verification information in the two-dimension code image, then send the two-dimension code verification information and login information preset in the mobile terminal to the remote server, and directly successfully log in to the application program by using the login information after the remote server verifies and passes the two-dimension code verification information.

This way of logging by using the two-dimension code not only may get rid of a traditional series of complex operations such as inputting an account number and a password, which is convenient and quick, but also may effectively prevent trojan horse from monitoring a keyboard to steal the input password, so that leakage of user information on the mobile terminal may be avoided to some degree. However, there are still certain potential security problems in the way of two-dimension code login. If the two-dimension code image provided by the application program is replaced by a trojan horse program with a malicious two-dimension code image, leakage of personal information may still be caused. For example, after scanning the replaced two-dimension code image, the mobile terminal may access a malicious website server according to information in the two-dimension code image, and send the personal information in the mobile terminal, such as the account number and the password to the malicious server, thereby causing the leakage of the user information and even losses of private property.

SUMMARY

Embodiments of the present invention provide a login information transmission method, a code scanning method and apparatus, and a server, so as to solve potential security problems of two-dimension code login.

The embodiments of the present invention provide a login information transmission method, applied to a server, the server including a memory, one or more processors, and a program instruction stored in the memory and executed by the one or more processors, and the method including: receiving user account number information and two-dimension code information sent from a client after the client logs in to an application and scans a two-dimension code; verifying whether the two-dimension code scanned by the client is consistent with a two-dimension code prestored in the server, and verifying whether the server stores account number information that is the same as the received user account number information; sending a confirmation request to the client, so as to request the client to confirm an application to be logged in to if a verification result is that the two-dimension code scanned by the client is consistent with the two-dimension code prestored in the server, and the server stores the account number information that is the same as the received user account number information; and sending login confirmation information to a corresponding application server, so as to instruct the application server to notify the client to log in to the application when confirmation pass information sent from the client is received.

The embodiments of the present invention further provide a code scanning method, applied to a client, the client including a memory, one or more processors, and a program instruction stored in the memory and executed by the one or more processors, and the method including: scanning a two-dimension code and acquiring two-dimension code information, the two-dimension code being used for logging in to an application; acquiring preset user account number information; sending the two-dimension code information and the user account number information to a server; receiving a confirmation request sent from the server after the server verifies and passes the two-dimension code information and the user account number information; displaying prompt information of the confirmation request; sending confirmation pass information input by a user to the server; and logging in to the application.

The embodiments of the present invention further provide a server, configured to transmit login information between at least one client and at least one application server, and including: a memory; one or more processors; and one or more program modules, stored in the memory and executed by the one or more processors, the one or more program modules including: a verification information receiving module, configured to receive user account number information and two-dimension code information sent from a client after the client logs in to an application and scans a two-dimension code; a verification module, configured to verify whether the two-dimension code scanned by the client is consistent with a two-dimension code prestored in the server, and verify whether the server stores account number information that is the same as the received user account number information; a secondary confirmation request sending module, configured to send a confirmation request to the client, so as to request the client to confirm an application to be logged in to if a verification result is that the two-dimension code scanned by the client is consistent with the two-dimension code prestored in the server, and the server stores the account number information that is the same as the received user account number information; and a secondary confirmation information receiving module, configured to receive confirmation pass information sent from the client; and a login confirmation information sending module, configured to send login confirmation information to a corresponding application server, so as to instruct the application server to notify the client to log in to the application.

The embodiments of the present invention further provide a code scanning apparatus, including: a memory; one or more processors; and one or more program modules, stored in the memory and executed by the one or more processors, the one or more program modules including: a code scanning module, configured to scan a two-dimension code and acquire two-dimension code information, the two-dimension code being used for logging in to an application; a user account number information acquiring module, configured to acquire preset user account number information; a verification information sending module, configured to send the two-dimension code information and the user account number information to a server; a secondary confirmation request receiving module, configured to receive a confirmation request sent from the server after the server verifies and passes the two-dimension code information and the user account number information; a prompt information display module, configured to display prompt information of the confirmation request; and a secondary confirmation information sending module, configured to send confirmation pass information input by a user to the server and log in to the application.

By using the login information transmission method, the code scanning method and apparatus, and the server of the embodiments, after the client scans the two-dimension code information, only a user account number needs to be provided for verification, and only after secondary confirmation passes, the server sends the login confirmation information including private information to the application server. Therefore, even if a two-dimension code image is replaced during a login process, the client will not leak personal private information of a user to a malicious server, which effectively improves security of two-dimension code login technologies.

BRIEF DESCRIPTION OF THE DRAWINGS

FIG. 6 is a schematic diagram of information storage in a memory of a server according to an embodiment of the present invention;

FIG. 7 is a flowchart of a code scanning method according to an embodiment of the present invention;

DESCRIPTION OF EMBODIMENTS

The foregoing and other technical content, features, and effects related to the present disclosure can be clearly presented in the detailed description of the preferred embodiments with reference to the drawings. Through the description of the specific implementation manners, the technical means used in the present disclosure for achieving the intended objectives and the effects can be understood more deeply and specifically. However, the accompanying drawings are merely provided for reference and are not used for limiting the present disclosure.

Figure 1:
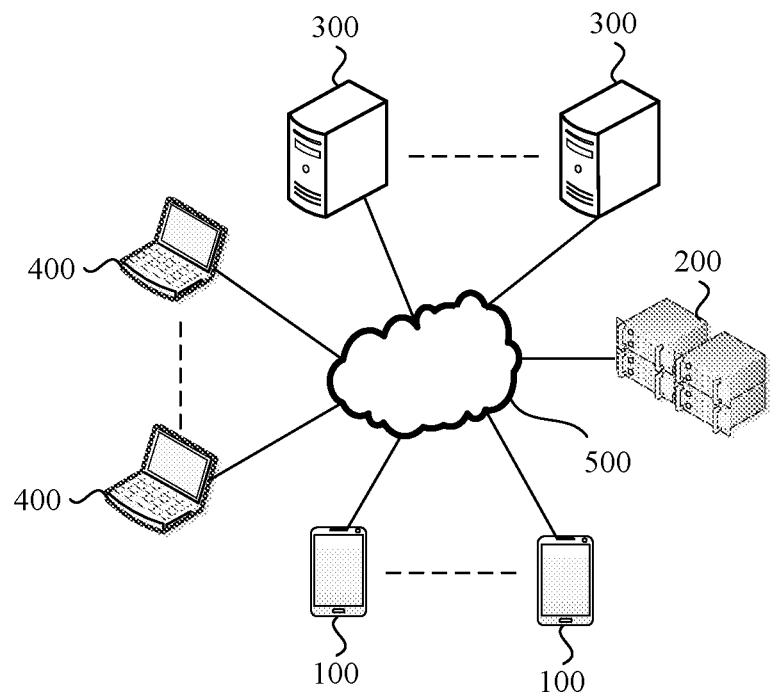
FIG. 1 is a schematic diagram of a running environment of a login information transmission method, a code scanning method and apparatus, and a server according to embodiments of the present invention.

Embodiments of the present invention relate to a login information transmission method, a code scanning method and apparatus, and a server. In the embodiment, the server may be a background server. Referring to FIG. 1, FIG. 1 is a schematic diagram of an application environment of the methods, the apparatus, and the server. At least one client 100, a server 200, at least one application server 300, and at least one login device 400 are connected to a network 500. The login device 400 may be an intelligent device having display and communication functions, such as a PC or a notebook computer. Application programs provided by the application server 300 are installed in the login device 400, users may log in to the applications by using the login device 400. The client 100 may be an intelligent device having shooting and communication functions, such as a tablet computer or a mobile phone. Users may quickly log in to the applications in the login device 400 by using the client 100. Specifically, users may scan a two-dimension code displayed on the login device 400 by using the own shooting function of the client 100, and transmit verification information carrying two-dimension code information to the server 200 for verification, and the application server 300 notifies the login device 400 to log in to corresponding application programs after verification passes. Especially, functions of the application server 300 and the server 200 may also be integrated in a same server, or a cluster of the application server 300 and the server 200 may be set in a same equipment room.

Figure 2:
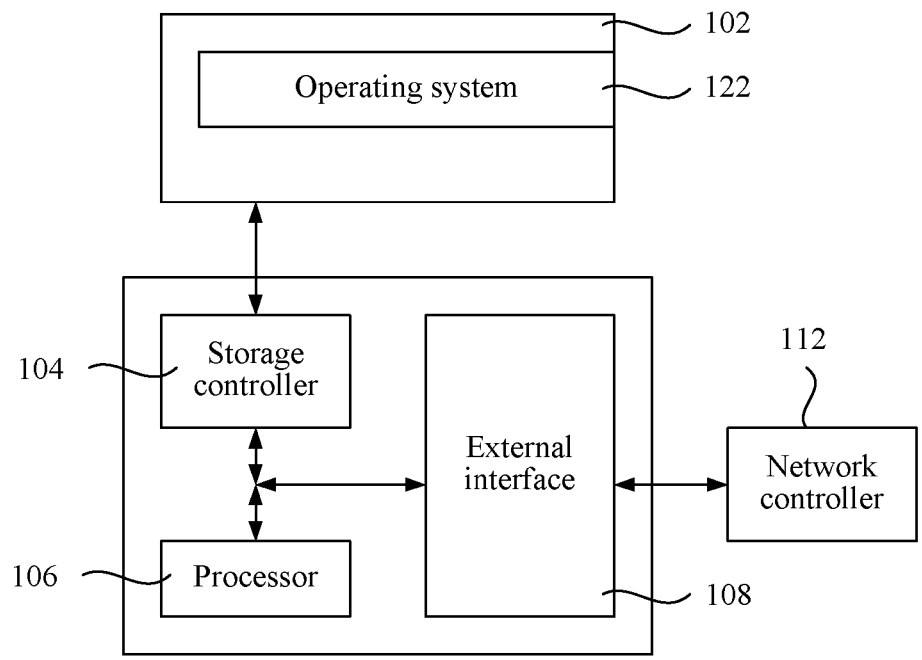
FIG. 2 is a schematic diagram of common components of the server in FIG. 1.

Further, referring to FIG. 2, FIG. 2 is a schematic diagram of common components that may be used by the server 200.

The server 200 includes a memory 102, a storage controller 104, one or more processors 106 (only one processor is shown in the figure), an external interface 108, and a network controller 112. It may be understood that the structure shown in FIG. 2 is merely exemplary and does not constitute any limitation to the structure of the server 200. For example, the server 200 may also include more or fewer components than those shown in FIG. 2, or have a configuration different from that shown in FIG. 2.

The memory 102 may be configured to store a software program and module, such as a program instruction/module corresponding to the login information transmission method in the embodiments of the present invention. The processor 106 runs the software program and module stored in the memory 102, to perform various functional applications and data processing, thereby implementing the foregoing method.

The memory 102 may include a high-speed random access memory, and may also include a non-volatile memory such as one or more magnetic storage apparatuses, a flash memory, or another non-volatile solid-state memory. In some embodiments, the memory 102 may further include memories remotely disposed relative to the processor 106, and these remote memories may be connected to the server 200 by using a network. Examples of the network include, but are not limited to, the Internet, an intranet, a local area network, a mobile communications network, and a combination thereof. The processor 106 and other possible components may access the memory 102 under the control of the storage controller 104.

The external interface 108 couples various input/output apparatuses to the processor 106. The processor 106 runs various software and instructions in the memory 102 and performs data processing. In some embodiments, the external interface 108, the processor 106, and the storage controller 104 may be implemented in a single chip. In some other embodiments, they may be each implemented by an independent chip.

The network controller 112 is configured to receive and send a network signal. The foregoing network signal may include a wireless signal or a wired signal. In an embodiment, the foregoing network signal is a wired network signal. In this case, the network controller 112 may include components such as a processor, a random access memory, a converter, and a crystal oscillator.

The software program and module stored in the memory 102 may include: an operating system 122. The operating system 122, for example, may be LINUX, UNIX, or WINDOWS, may include various software components and/or drivers configured to manage system tasks (such as memory management, storage device control, and power supply management), and may communicate with various hardware or software components, so as to provide a running environment for other software components.

Figure 3:
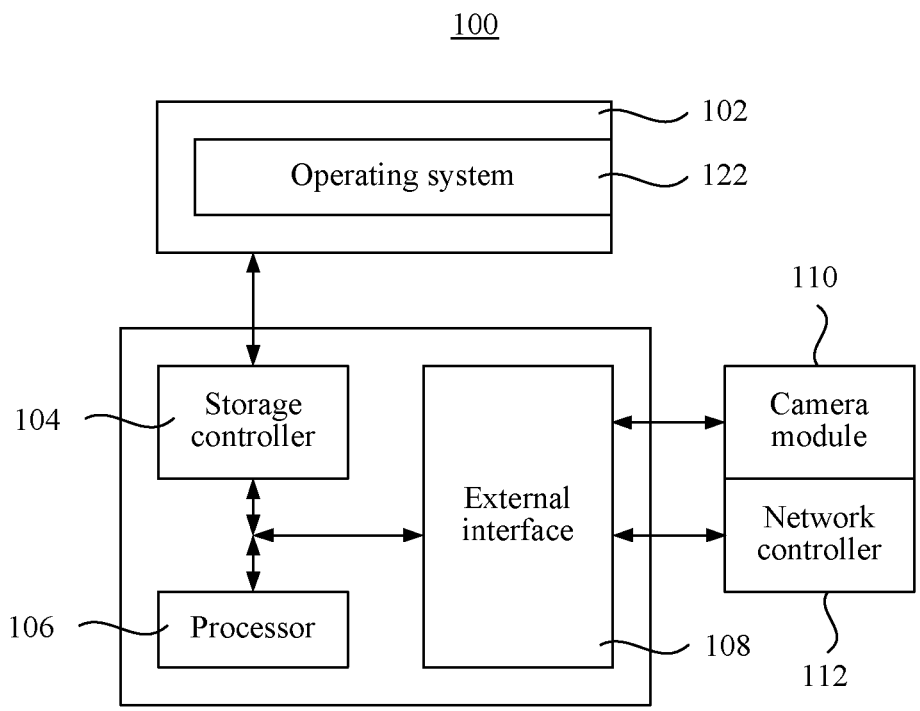
FIG. 3 is a schematic diagram of common components of a client in FIG. 1.

Further, referring to FIG. 3, FIG. 3 is a schematic diagram of common components of the client 100 in FIG. 1. It can be seen that the structure of the client 100 is similar to that of the server 200; and a difference lies in that the client 100 may further include a camera module 110. The camera module 110 is configured to photograph photos or videos. The photos or the videos photographed may be stored into the memory 102, and sent by using the network controller 112. The camera module 110 may specifically include components such as a lens module, an image sensor, and a flashing light. The lens module is configured to image a photographed target and map the image to the image sensor. The image sensor is configured to receive lights form the lens module to implement sensitization, so as to record image information. Specifically, the image sensor may be implemented based on a complementary metal oxide semiconductor (CMOS), a charge-coupled device (CCD), or another image sensing principle. The flashing light is configured to perform exposure compensation during photographing. Generally, a flashing light used for the client 100 may be a light emitting diode (LED) flashing light.

Figure 4:
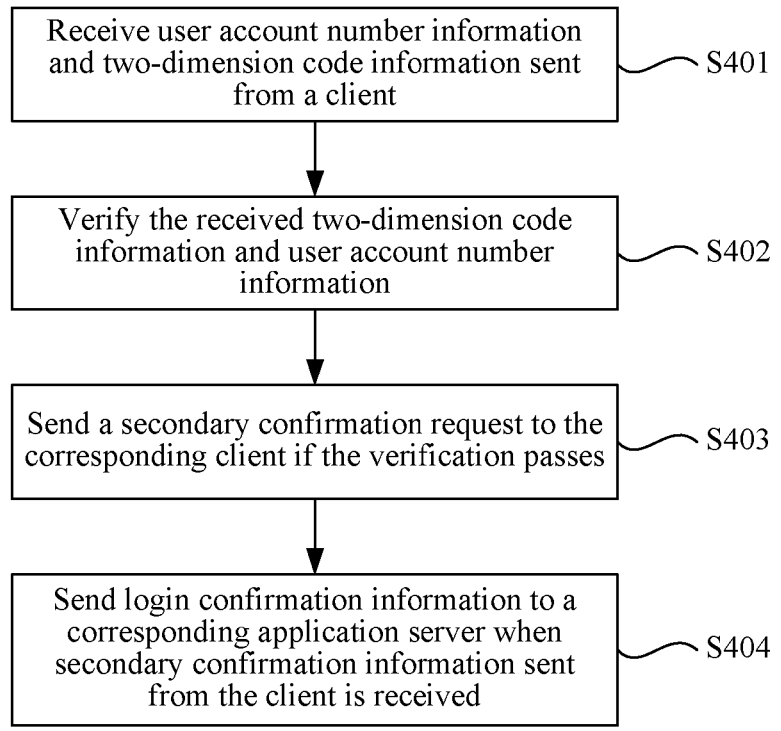
FIG. 4 is a flowchart of a login information transmission method according to an embodiment of the present invention.

The embodiments of the present invention provide a login information transmission method applied to a server and configured to transmit login information between at least one client and at least one application server. Referring to FIG. 4, the method of this embodiment includes the following steps:

S401: Receive user account number information and two-dimension code information sent from a client after the client logs in to an application and scans a two-dimension code.

The user account number information merely includes information that may be disclosed, such as, an account number provided by the server for a user for verification, but does not include private information such as a password. The user account number information is mainly used for confirming a correspondence between the server and the client, so as to establish a communication channel with the client.

S402: Verify the received two-dimension code information and user account number information. Verifying the two-dimension code information refers to verifying whether the two-dimension code photographed by the client is consistent with a two-dimension code prestored in the server, and verification passes if the two-dimension code photographed by the client is consistent with the two-dimension code prestored in the server. Verifying the user account number information refers to determining whether the server stores account number information that is the same as the received user account number information, and verification passes if the server stores the account number information that is the same as the received user account number information.

S403: Send a confirmation request to the corresponding client, so as to request the client to confirm an application to be logged in to if the verification passes, or end the process or return information that the verification fails to the corresponding client if the verification fails.

Specifically, it is determined that the verification passes if a verification result is that the two-dimension code scanned by the client is consistent with the two-dimension code prestored in the server, and the server stores the account number information that is the same as the received user account number information. For the verification, the confirmation request herein is equivalent to secondary confirmation. Therefore, the following description refers to the confirmation request as a secondary confirmation request, and refers to response information received with regard to the secondary confirmation request as secondary confirmation pass information, i.e., confirmation pass.

S404: Send login confirmation information to a corresponding application server, so as to instruct the application server to notify the client to log in to the application when secondary confirmation pass information sent from the client is received.

The server prestores information about an application program corresponding to a user account number. For example, it is assumed that the application is a game client. The background may prestore information such as a game account number, a password, a game role, and an address of a game server corresponding to a user account number. The secondary confirmation request is used for letting a user further confirm the application to be logged in to. Only after secondary confirmation passes, the server sends the login confirmation information (which may include the private information such as an account number and a password of the application) to the corresponding application server, so that the application server notifies a corresponding login device that the client may log in to the application. In this way, even if the two-dimension code acquired by the client through scanning is replaced by a trojan horse program, the private information in the client is not leaked. Only after secondary confirmation passes, the server sends the corresponding login confirmation information to the application server. Therefore, based on existing two-dimension code login technologies, use security of the client is further improved.

Figure 5:
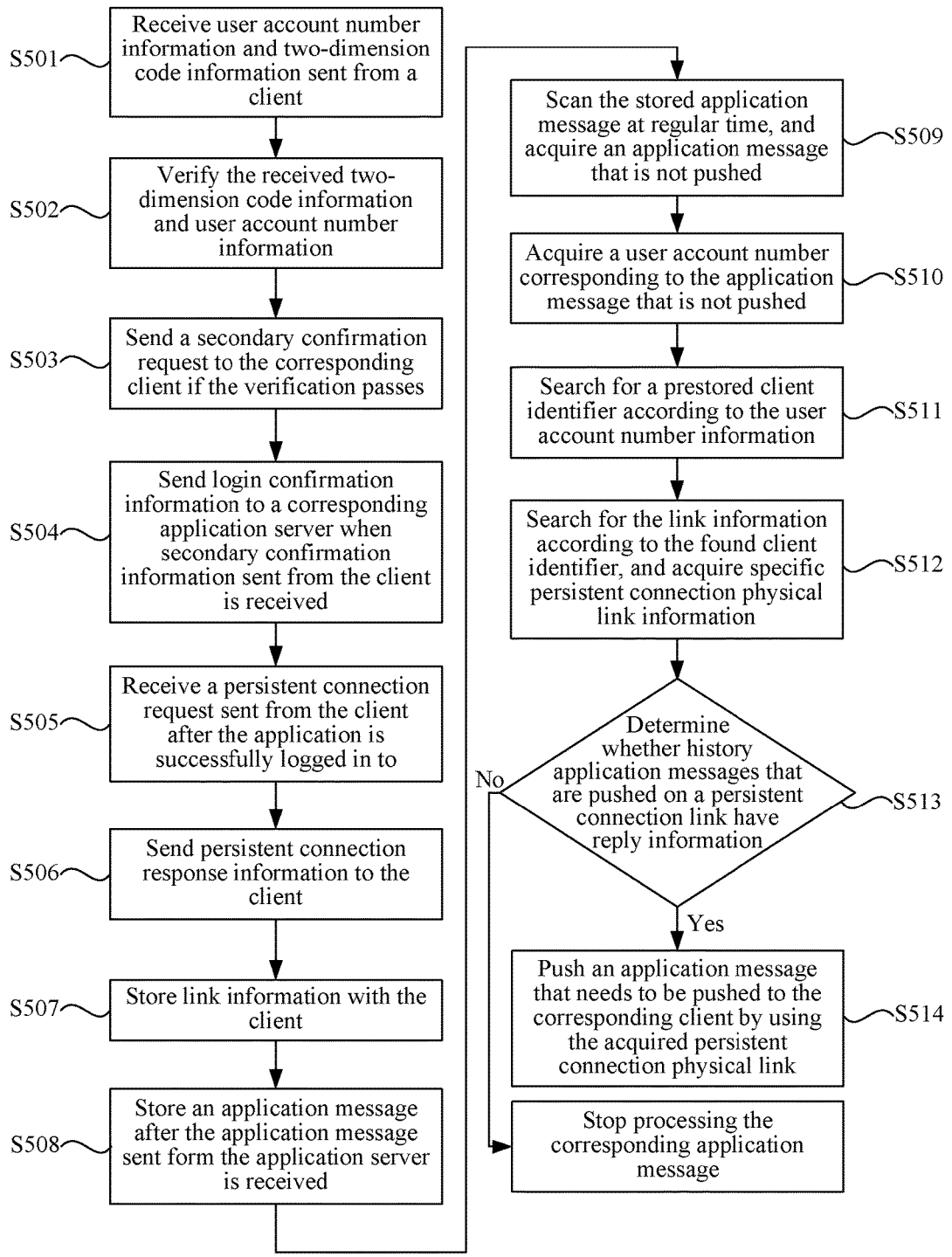
FIG. 5 is a flowchart of another login information transmission method according to an embodiment of the present invention.

Referring to FIG. 5, FIG. 5 is a flowchart of another login information transmission method according to an embodiment of the present invention. The login information transmission method is applied to a server, and includes the following steps:

S501: Receive user account number information and two-dimension code information sent from a client after the client logs in to an application and scans a two-dimension code.

S502: Verify the received two-dimension code information and user account number information.

S503: Send a secondary confirmation request to the corresponding client, so as to request the client to confirm an application to be logged in to if the verification passes, or end the process or return information that the verification fails to the corresponding client if the verification fails.

S504: Send login confirmation information to a corresponding application server, so as to instruct the application server to notify the client to log in to the application when secondary confirmation pass information sent from the client is received. The login confirmation information includes information needed by application login. The application server sends a notice to a corresponding login device via a network after receiving the login confirmation information, and instructs the application at a login device end to be automatically logged in to.

S505: Receive a persistent connection request sent from the client after the application is successfully logged in to.

S506: Send persistent connection response information to the client, so as to establish a persistent connection to the client. The persistent connection may send multiple data packets on one connection continuously, and keep connected in certain time after finishing sending the multiple data packets.

S507: Store link information with the client. The link information refers to connection information with the client. Persistent connection links between the server and clients may be conveniently and rapidly found by using the link information. The link information may include account number information, a client identifier, an access layer IP address, a time stamp, or the like.

S508: Store an application message after the application message sent from the application server is received.

Because network environments are complex (such as bandwidth constraint or wireless signal strength) most often, if the application server directly sends the application message to the client via the network, signal transmission costs are high, and data packet losses are easily caused, resulting in that users miss important application messages. Therefore, in this embodiment, the server uniformly receives and stores application messages sent by the application server, and by subsequently reusing the persistent connection established between the server and the client, pushes the application messages to the corresponding client, which can effectively ensure delivery of the application messages.

Due to information transmission and direction needs, information stored in a memory of the server needs to include a few sections. Referring to FIG. 6, FIG. 6 is a schematic diagram of information storage in a memory of a server according to an embodiment of the present invention. The stored information includes: a link information section, a sending queue buffer section, an application login information section, and a backup data section. Link information stores the connection information of the client, is used for searching for persistent connection physical connection links between the server and the clients, and includes the client identifier, the user account number information, the access layer IP address, or the like. A sending queue buffer stores data to be pushed, including specific application messages to be pushed, time stamps, target application account numbers, and the like. Application login information stores a correspondence between an application and the client, and is used for finding a transmission direction of information sent to the client, including a user account number, application server numbers, related data of the user account number (such as a name of an application that the user account number once logs in to, and an application account number) corresponding to the application, and the like. The backup data section is similar to the sending queue buffer section, but the backup data section is persistently stored, so as to avoid data losses after a machine reboots or fails.

It should be noted that the client identifier may refer to an identifier of a client device, and may also be an identifier of an application program provided by the server for the client. If a user performs two-dimension code login by fixedly using a same client, the client identifier may refer to the identifier of a client device. However, if the user may perform the two-dimension code login by using different clients, the client identifier may be the identifier of an application program provided by the server for the client for case of finding a connection link between the server and the client by using the user account number.

S509: Scan the stored application message at regular time, and acquire an application message that is not pushed. Specifically, that is, scan the sending queue buffer at regular time, and acquire an application message stored in the sending queue buffer. An application message that is pushed and an application message that is beyond a certain deadline according to the time stamp may be deleted from the sending queue buffer.

S510: Acquire a user account number corresponding to the application message that is not pushed. Specifically, when the sending queue buffer is searched for, at the same time of obtaining the application message, the corresponding application account number receiving the application message may also be obtained. If the application account number uses the user account number, the user account number may be obtained in a process of searching for the sending queue buffer. If the application account number is different from the user account number, the user account number may be obtained by searching for the application login information according to the application account number.

S511: Search for a prestored client identifier according to the user account number information. Specifically, that is, search for the application login information by using the user account number, and acquire a corresponding client identifier.

S512: Search for the link information according to the found client identifier, and acquire specific persistent connection physical link information. Specifically, that is, search for the link information according to the client identifier, and find a specific persistent connection physical link information.

S513: Determine whether historically pushed messages sent to a client corresponding to the application message that is not pushed have corresponding reply information. Specifically, the persistent connection link found in step S512 is a communication link to be used by the message that is not pushed. According to the obtained link information, whether application messages once pushed on this persistent connection link have corresponding reply information, i.e., in a history record, whether the client has fed back an information reply packet after an application message is sent to a certain client, may be searched for. If there is a message that is pushed receiving no reply information, it indicates that this persistent connection link may be disconnected, and processing on the application messages pushed on this persistent connection link is stopped. On the contrary, if the persistent connection link connects normally, step S514 is entered to push an application message that needs to be pushed to the corresponding client.

S514: Push the application message that needs to be pushed to the corresponding client by using the persistent connection physical link information acquired.

Referring to FIG. 7, FIG. 7 is a flowchart of a code scanning method according to an embodiment of the present invention applied to a client and used for confirming login information by using a server during two-dimension code login. The method of this embodiment includes the following steps:

S701: Scan a two-dimension code and acquire two-dimension code information. The two-dimension code is provided by the server and displayed on a login device.

S702: Acquire preset user account number information. The user account number information is provided by the server and used for verifying an identity of the client, so as to establish a communication link between the server and the client.

S703: Send the two-dimension code information and the user account number information to the server. The server may verify the two-dimension code information and the user account number information after receiving the two-dimension code information and the user account number information.

S704: Receive a secondary confirmation request sent from the server after the server verifies and passes the two-dimension code information and the user account number information.

S705: Display prompt information of the secondary confirmation request.

S706: Send secondary confirmation information input by a user to the server.

The secondary confirmation request is used for letting a user further confirm the application to be logged in to. Only after secondary confirmation passes, the server sends the login confirmation information (which may include the private information such as an account number and a password of the application) to the corresponding application server, so that the application server notifies a corresponding login device to log in to the application. In this way, even if the two-dimension code acquired by the client through scanning is replaced by a trojan horse program, the private information in the client is not leaked. Only after secondary confirmation passes, the server sends the corresponding login confirmation information to the application server. Therefore, based on existing two-dimension code login technologies, use security of the client is further improved.

Figure 8:
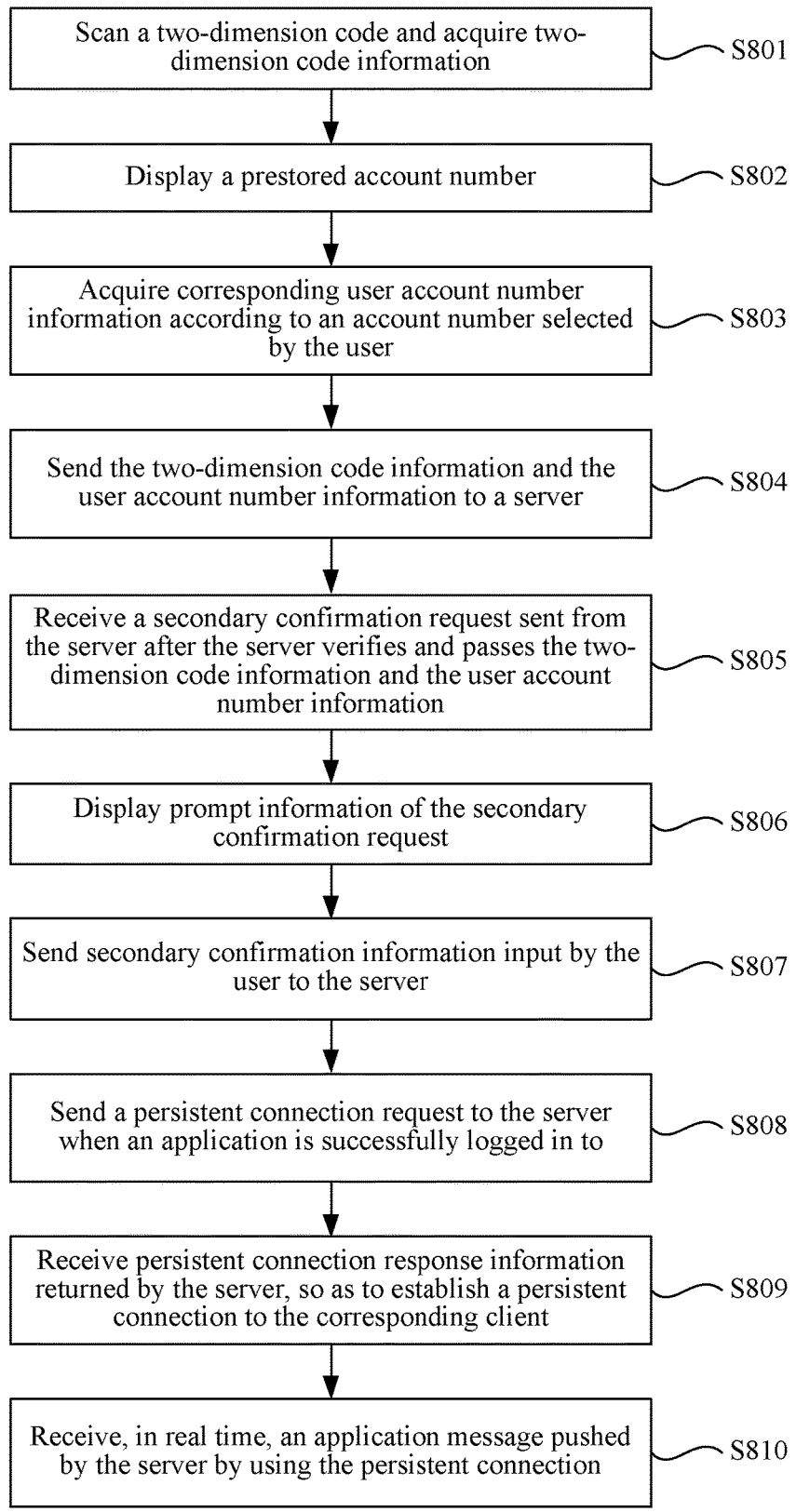
FIG. 8 is a flowchart of another code scanning method according to an embodiment of the present invention.

Referring to FIG. 8, FIG. 8 is a flowchart of another code scanning method according to an embodiment of the present invention. The method includes the following steps:

S801: Scan a two-dimension code and acquire two-dimension code information.

S802: Display a prestored account number.

S803: Acquire corresponding user account number information according to an account number selected by the user.

S804: Send the two-dimension code information and the user account number information to a server.

S805: Receive a secondary confirmation request sent from the server after the server verifies and passes the two-dimension code information and the user account number information.

S806: Display prompt information of the secondary confirmation request.

S807: Send secondary confirmation information input by the user to the server.

S808: Send a persistent connection request to the server when the application is successfully logged in to.

S809: Receive persistent connection response information returned by the server, so as to establish a persistent connection to the corresponding client.

S810: Receive, in real time, an application message pushed by the server by using the persistent connection.

In order to further understand this embodiment, a process of logging in to a game is described as an example.

Figure 9:
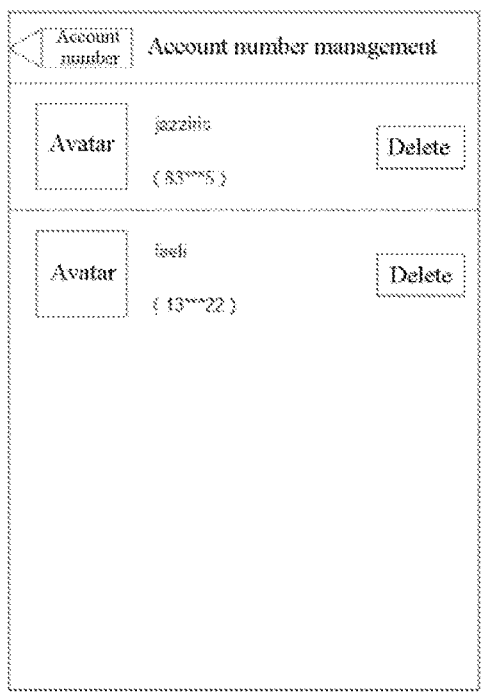
FIG. 9 is a schematic diagram of a user account number selection interface according to an embodiment of the present invention.

After a two-dimension code image is scanned successfully, the user account number information is displayed on a display screen of the client. As shown in FIG. 9, a user account number here is a game account number, and a displayed account number is an account number that is stored in the client and is once used during login. The client may store multiple user account numbers. Therefore, a user may select a corresponding account number through step S802 and step S803, and the corresponding account number and the two-dimension code information may be sent to the server together.

Figure 10:
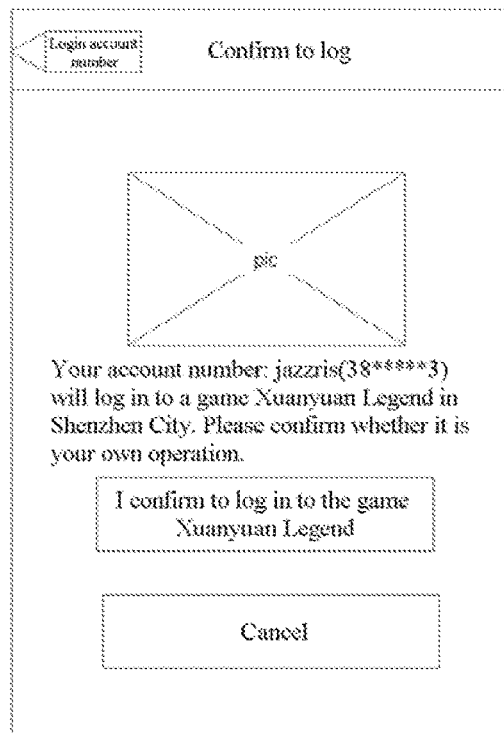
FIG. 10 is a schematic diagram of a secondary confirmation prompt interface according to an embodiment of the present invention.

The server may return the secondary confirmation request after verifying and passing the two-dimension code information and the user account number. As shown in FIG. 10, information about the user account number and a game to be logged in to may be prompted on a display interface of the secondary confirmation request. After the user selects to confirm, the client sends the secondary confirmation information to the server, and then the server sends login confirmation information to a corresponding game server. Finally, the game server notifies a login device to log in to a game.

Figure 11:
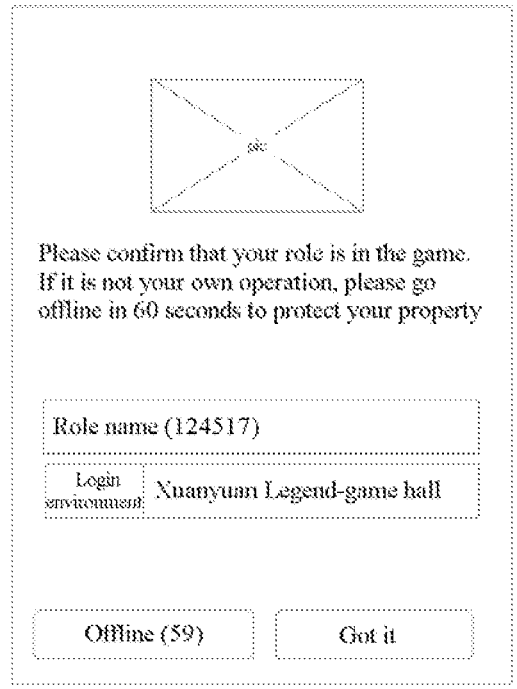
FIG. 11 is a schematic diagram of a display interface of a pushed message according to an embodiment of the present invention.

After the game is successfully logged in to, the server may establish a persistent connection to the client, and push, at regular time, messages sent from the game server to the corresponding client. For example, when the game is offline, the game server may send offline confirmation information to the server, and the server may push the offline confirmation information to a corresponding client. As shown in FIG. 11, only after the user confirms to be offline at a client side, the game server may receive a game offline operation. Moreover, virtual property trades, system messages, chat information, and the like during the game may all be pushed to the corresponding client by using the server. Not only can delivery of information be ensured, to prevent data packet losses, but also it may be ensured that various operations during the game are confirmed by the user, to improve security of the game operations.

Figure 12:
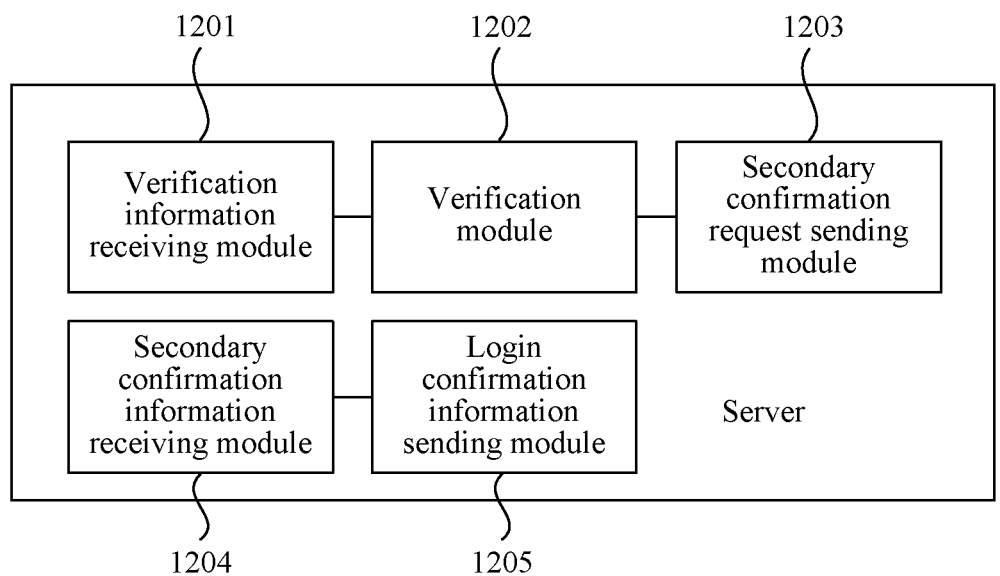
FIG. 12 is a structural diagram of a server according to an embodiment of the present invention.

The embodiments of the present invention further provide a server configured to transmit login information between at least one client and at least one application server. Referring to FIG. 12, FIG. 12 is a structural diagram of a server according to an embodiment of the present invention. The server includes: a verification information receiving module 1201, a verification module 1202, a secondary confirmation request sending module 1203, a secondary confirmation information receiving module 1204, and a login confirmation information sending module 1205.

The verification information receiving module 1201 is configured to receive user account number information and two-dimension code information sent from a client.

The verification module 1202 is configured to verify the two-dimension code information and the user account number information received by the verification information receiving module 1201.

The secondary confirmation request sending module 1203 is configured to send a secondary confirmation request to the corresponding client when the verification module 1202 verifies and passes the two-dimension code information and the user account number information.

The secondary confirmation information receiving module 1204 is configured to receive secondary confirmation information sent from the client.

The login confirmation information sending module 1205 is configured to send login confirmation information to a corresponding application server after the secondary confirmation information receiving module 1204 receives the secondary confirmation information.

By using the server of this embodiment, after the client scans the two-dimension code information, only a user account number needs to be provided for verification, and only after secondary confirmation passes, the server sends the login confirmation information including private information to the application server. Therefore, even if a two-dimension code image is replaced during a login process, the client will not leak personal private information of a user to a malicious server, which effectively improves security of two-dimension code login technologies.

Figure 13:
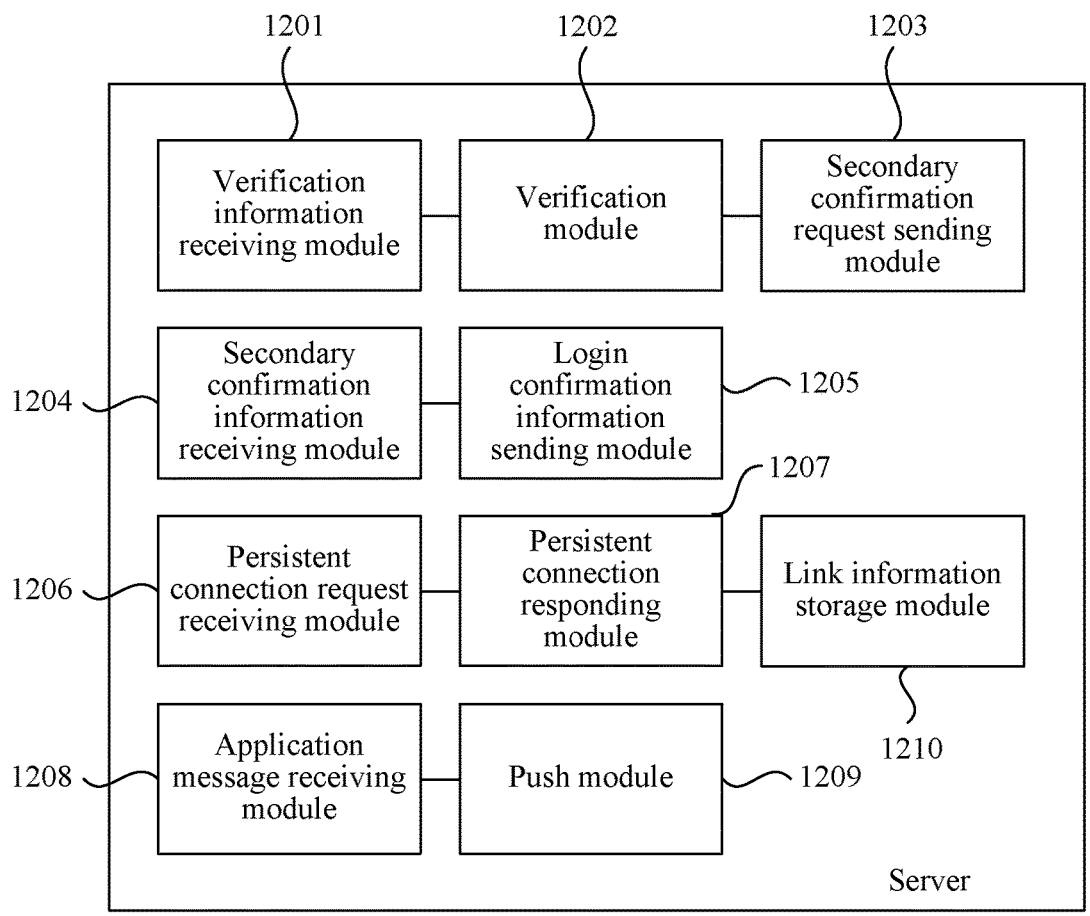
FIG. 13 is a structural diagram of another server according to an embodiment of the present invention.

Referring to FIG. 13, FIG. 13 is a structural diagram of another server according to an embodiment of the present invention. Compared with the embodiment in FIG. 12, the server of this embodiment not only includes: a verification information receiving module 1201, a verification module 1202, a secondary confirmation request sending module 1203, a secondary confirmation information receiving module 1204, and a login confirmation information sending module 1205, but also includes: a persistent connection request receiving module 1206, a persistent connection responding module 1207, an application message receiving module 1208, a push module 1209, and a link information storage module 1210.

The persistent connection request receiving module 1206 is configured to receive a persistent connection request sent from the client after the application is successfully logged in to.

The persistent connection responding module 1207 is configured to send persistent connection response information to the corresponding client, so as to establish a persistent connection to the corresponding client after the persistent connection request receiving module 1206 receives the persistent connection request.

The link information storage module 1210 is configured to store link information with the client after the persistent connection responding module 1207 responds to the persistent connection request sent from the client. The link information refers to connection information with the client.

The application message receiving module 1208 is configured to receive and store an application message sent from the application server.

The push module 1209 is configured to push the application message to the corresponding client by using the persistent connection when the application message receiving module receives the application message.

Figure 14:
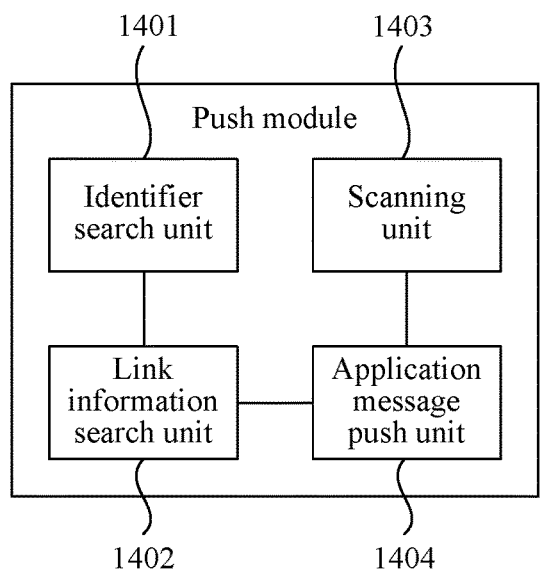
FIG. 14 is a structural diagram of an embodiment of a push module in FIG. 13.

Referring to FIG. 14, FIG. 14 is a structural diagram of an embodiment of a push module in FIG. 13, where the push module 1209 further includes: an identifier search unit 1401, a link information search unit 1402, a scanning unit 1403, and an application message push unit 1404.

The identifier search unit 1401 is configured to search for a prestored client identifier according to user account number information.

The link information search unit 1402 is configured to search for the stored link information according to the client identifier found by the identifier search unit 1401, and acquire specific persistent connection physical link information.

The scanning unit 1403 is configured to scan the stored application message at regular time, and determine whether there is an application message that needs to be pushed.

The application message push unit 1404 is configured to push the application message that needs to be pushed to the corresponding client by using the persistent connection.

Figure 15:
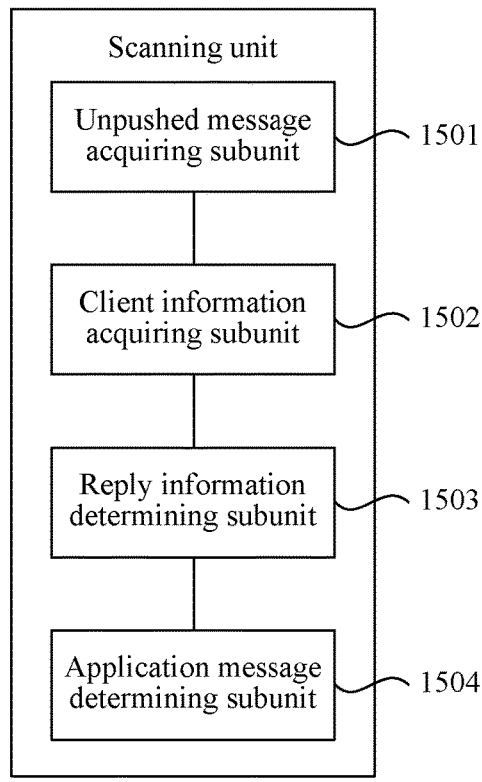
FIG. 15 is a structural diagram of an embodiment of a scanning unit 1403 in FIG. 14.

Referring to FIG. 15, FIG. 15 is a structural diagram of an embodiment of a scanning unit in FIG. 14. The scanning unit includes: an unpushed message acquiring subunit 1501, a client information acquiring subunit 1502, a reply information determining subunit 1503, and an application message determining subunit 1504.

The unpushed message acquiring subunit 1501 is configured to scan stored application message at regular time, and acquire an application message that is not pushed.

The client information acquiring subunit 1502 is configured to acquire client information corresponding to the application message that is not pushed when the unpushed message acquiring subunit 1501 scans the application message that is not pushed.

The reply information determining subunit 1503 is configured to determine whether historically pushed messages sent to a client corresponding to the client information acquired by the client information acquiring subunit 1502 have corresponding reply information.

The application message determining subunit 1504 is configured to determine that the corresponding application message that is not pushed is the application message that needs to be pushed when the reply information determining subunit 1503 determines that there is the reply information.

By using the server in this embodiment, not only is security of two-dimension code login technologies further improved, but also delivery of the application message in a complex network situation is ensured by using a persistent connection to the client to push the application message sent from an application server to the corresponding client.

Figure 16:
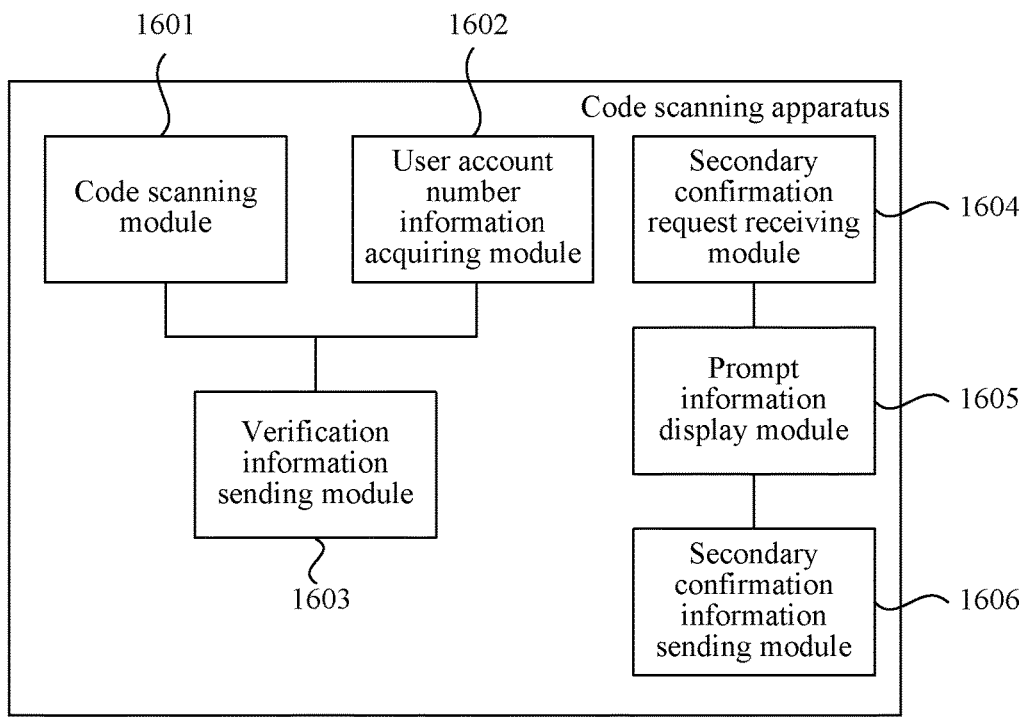
FIG. 16 is a structural diagram of a code scanning apparatus according to an embodiment of the present invention.

The embodiments of the present invention further provide a code scanning apparatus applied to a client and used for confirming login information by using a server during two-dimension code login. Referring to FIG. 16, FIG. 16 is a structural diagram of a code scanning apparatus according to an embodiment of the present invention. The code scanning apparatus includes: a code scanning module 1601, a user account number information acquiring module 1602, a verification information sending module 1603, a secondary confirmation request receiving module 1604, a prompt information display module 1605, and a secondary confirmation information sending module 1606.

The code scanning module 1601 is configured to scan a two-dimension code and acquire two-dimension code information.

The user account number information acquiring module 1602 is configured to acquire preset user account number information.

The verification information sending module 1603 is configured to send the two-dimension code information and the user account number information to a server.

The secondary confirmation request receiving module 1604 is configured to receive a secondary confirmation request sent from the server after the server verifies and passes the two-dimension code information and the user account number information.

The prompt information display module 1605 is configured to display prompt information of the secondary confirmation request.

The secondary confirmation information sending module 1606 is configured to send secondary confirmation information input by a user to the server.

Figure 17:
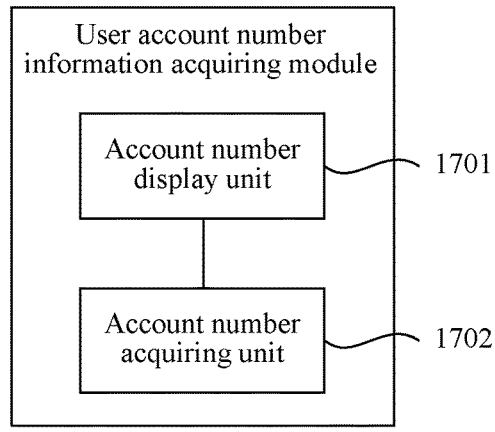
FIG. 17 is a structural diagram of an embodiment of a user account number information acquiring module in FIG. 16.

Referring to FIG. 17, FIG. 17 is a structural diagram of an embodiment of a user account number information acquiring module in FIG. 16. The user account number information acquiring module includes: an account number display unit 1701 and an account number acquiring unit 1702. The account number display unit 1701 is configured to display a prestored account number. The account number acquiring unit 1702 is configured to acquire corresponding user account number information according to an account number selected by the user.

Figure 18:
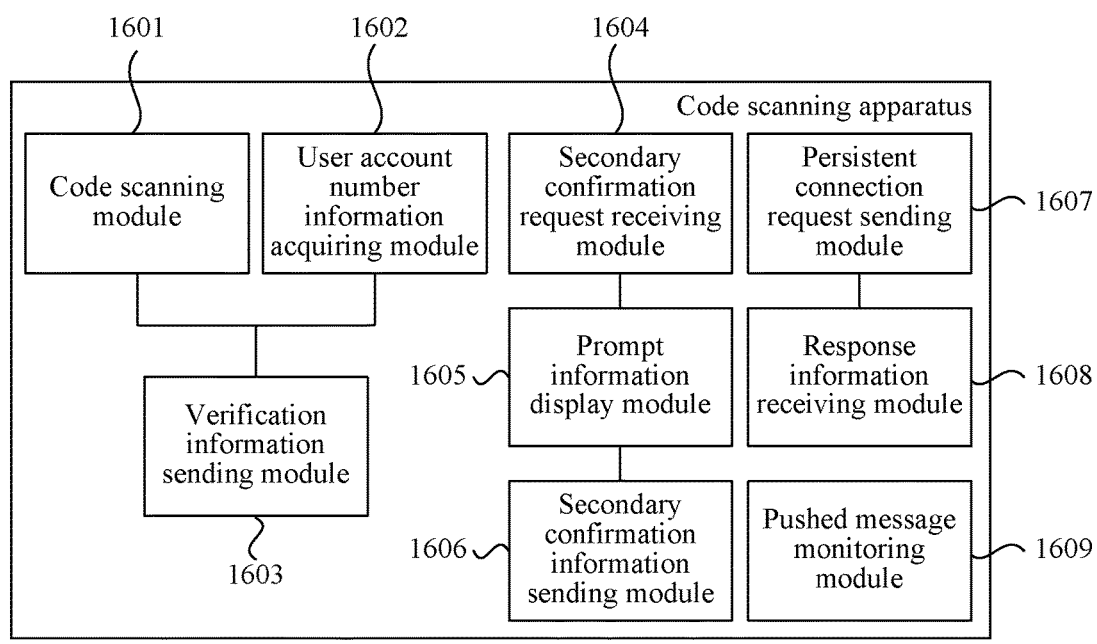
FIG. 18 is a structural diagram of another code scanning apparatus according to an embodiment of the present invention.

Referring to FIG. 18, FIG. 18 is a structural diagram of another code scanning apparatus according to an embodiment of the present invention. Compared with the embodiment in FIG. 16, the code scanning apparatus of this embodiment not only includes: a code scanning module 1601, a user account number information acquiring module 1602, a verification information sending module 1603, a secondary confirmation request receiving module 1604, a prompt information display module 1605, and a secondary confirmation information sending module 1606, but also includes: a persistent connection request sending module 1607, a response information receiving module 1608, and a pushed message monitoring module 1609.

The persistent connection request sending module 1607 is configured to send a persistent connection request to a server when the application is successfully logged in to.

The response information receiving module 1608 is configured to receive persistent connection response information returned by the server, so as to establish a persistent connection to the corresponding client.

The pushed message monitoring module 1609 is configured to receive, in real time, an application message pushed by the server by using the persistent connection.

Through the description of the foregoing implementation manners, a person skilled in the art may clearly understand that the embodiments of the present invention may be implemented by hardware or by software in addition to a necessary universal hardware platform. Based on such understanding, the technical solutions of the embodiments of the present invention may be implemented in the form of a software product. The software product may be stored in a non-volatile storage medium (which may be a CD-ROM, a USB flash drive, a removable hard disk, or the like) and includes several instructions for instructing a computer device (which may be a personal computer, a server, a network device, or the like) to perform the methods described in various implementation scenarios in the embodiments of the present invention.

The foregoing descriptions are merely preferred embodiments of the present invention, and are not intended to limit the present disclosure in any form. Although the present disclosure has been disclosed above through the preferred embodiments, the embodiments are not intended to limit the present disclosure. A person skilled in the art can make some equivalent variations, alterations or modifications to the above-disclosed technical content without departing from the scope of the technical solutions of this application to obtain equivalent embodiments. Any simple alteration, equivalent change or modification made to the above embodiments according to the technical essence of the present disclosure without departing from the content of the technical solutions of this application shall fall within the scope of the technical solutions of the present disclosure.

The invention claimed is:

1. A login information transmission method, applied to a server, the server comprising a memory, one or more processors, and a program instruction stored in the memory and executed by the one or more processors, and the method comprising:
   receiving user account number information and two-dimension code information sent from a client after the client logs in to an application and scans a two-dimension code;
   verifying whether the two-dimension code scanned by the client is consistent with a two-dimension code prestored in the server, and verifying whether the server stores account number information that is the same as the user account number information received;
   sending a confirmation request to the client, so as to request the client to confirm an application to be logged in to if a verification result is that the two-dimension code scanned by the client is consistent with the two-dimension code prestored in the server, and the server stores the account number information that is the same as the user account number information received;
   sending login confirmation information to a corresponding application server, so as to instruct the application server to notify the client to log in to the application when confirmation pass information sent from the client is received;
   receiving an application message sent from the application server; and
   pushing the application message to the client by using a persistent connection between the application server and the client, which comprises:
   storing the application message after the application message sent from the application server is received;
   scanning the application message stored at regular time, and determining whether there is an application message that needs to be pushed; and
   pushing the application message that needs to be pushed to the corresponding client by using the persistent connection.

2. The method according to claim 1, further comprising:
   before receiving the application message sent from the application server, receiving a persistent connection request sent from the client after the application is successfully logged in to;

sending persistent connection response information to the client, so as to establish a persistent connection to the client; and storing link information with the client, the link information referring to connection information of the server with the client.

3. The method according to claim 1, wherein pushing the application message to the client by using the persistent connection further comprises:

searching for a prestored client identifier according to the user account number information;

searching for the link information according to the found client identifier, and acquiring persistent connection physical link information; and pushing the application message to the client by using the persistent connection physical link information.

4. The method according to claim 1, wherein scanning the application message stored at regular time, and determining whether there is an application message that needs to be pushed comprises:

scanning the application message stored at regular time, and acquiring an application message that is not pushed;

acquiring client information corresponding to the application message that is not pushed;

determining whether historically pushed messages sent to a client corresponding to the client information have corresponding reply information; and determining that the corresponding application message that is not pushed is the application message that needs to be pushed if there is the reply information.

5. A server, configured to transmit login information between at least one client and at least one application server, comprising one or more processors and memory storing instructions that, when executed by the one or more processors, cause the one or more processors to:

receive user account number information and two-dimension code information sent from a client after the client logs in to an application and scans a two-dimension code;

verify whether the two-dimension code scanned by the client is consistent with a two-dimension code prestored in the server, and verify whether the server stores account number information that is the same as the user account number information received;

send a confirmation request to the client, so as to request the client to confirm an application to be logged in to if a verification result is that the two-dimension code scanned by the client is consistent with the two-dimension code prestored in the server, and the server stores the account number information that is the same as the user account number information received; and receive confirmation pass information sent from the client;

send login confirmation information to a corresponding application server, so as to instruct the application server to notify the client to log in to the application;

receive an application message sent from the application server; and push the application message to the client by using a persistent connection between the application server and the client;

wherein pushing the application comprises:

scanning the application message stored at regular time, and determine whether there is an application message that needs to be pushed; and pushing the application message that needs to be pushed to the corresponding client by using the persistent connection.

6. The server according to claim 5, wherein the instructions further cause the processors to:

receive a persistent connection request sent from the client after the application is successfully logged in to;

send persistent connection response information to the client, so as to establish a persistent connection to the corresponding client; and store link information with the client after a response to the persistent connection request sent from the client, the link information referring to connection information of the server with the client.

7. The server according to claim 6, wherein pushing the application comprises:

searching for a prestored client identifier according to the user account number information;

searching for the link information according to the found client identifier, and acquiring persistent connection physical link information; and pushing the application message to the client by using the persistent connection physical link information.

8. The server according to claim 5, wherein scanning the application message comprises:

scanning the application message stored at regular time, and acquiring an application message that is not pushed;

acquiring client information corresponding to the application message that is not pushed;

determining whether historically pushed messages sent to a client corresponding to the client information have corresponding reply information; and determining that the corresponding application message that is not pushed is the application message that needs to be pushed based on a determination that there is reply information.

9. A code scanning apparatus, comprising one or more processors and memory storing instructions that, when executed by the one or more processors, cause the one or more processors:

scan a two-dimension code and acquire two-dimension code information, the two-dimension code being used for logging in to an application;

acquire preset user account number information;

send the two-dimension code information and the user account number information to a server;

receive a confirmation request sent from the server after the server verifies and passes the two-dimension code information and the user account number information;

display prompt information of the confirmation request; and send confirmation pass information input by a user to the server and log in to the application, such that an application message sent from the server is received and stored, the stored application message is scanned at regular time, it is determined that whether there is an application message that needs to be pushed, and the application message that needs to be pushed is pushed to the corresponding client by using a persistent connection between the server and the client.

10. The code scanning apparatus according to claim 9, wherein acquiring preset user account number information comprises:

displaying a prestored account number; and acquiring corresponding user account number information according to an account number selected by the user.

11. The code scanning apparatus according to claim 9, wherein the instructions further cause the processor to:
send a persistent connection request to the server when the application is successfully logged in to;
receive persistent connection response information returned by the server, so as to establish a persistent connection to the corresponding client; and
receive, in real time, an application message pushed by the server by using the persistent connection.

\* \* \* \* \*